United States Patent [19]
Anderson et al.

[11] Patent Number: 5,818,820
[45] Date of Patent: Oct. 6, 1998

[54] METHOD AND SYSTEM FOR DATA LINK EXPANSION OR CONTRACTION USING SPREAD SPECTRUM TDMA COMMUNICATION

[75] Inventors: Gary B. Anderson, Carnelian Bay; Peter O. Peterson, Colorado Springs, both of Colo.

[73] Assignee: Omnipoint Corporation, Colorado Springs, Colo.

[21] Appl. No.: 478,384

[22] Filed: Jun. 7, 1995

Related U.S. Application Data

[63] Continuation of Ser. No. 284,053, Aug. 1, 1994, which is a continuation-in-part of Ser. No. 215,306, Mar. 21, 1994, abandoned, which is a continuation-in-part of Ser. No. 146,496, Nov. 1, 1993, abandoned.

[51] Int. Cl.⁶ .................................................. H04B 7/212
[52] U.S. Cl. .......................... 370/280; 370/337; 370/348; 370/468; 455/452
[58] Field of Search ...................................... 375/200, 205; 370/18, 24, 29, 84, 85.7, 95.1, 95.3, 321, 322, 329, 336, 337, 347, 348, 442, 443, 468, 280, 281, 294, 295; 455/450, 452

[56] References Cited

U.S. PATENT DOCUMENTS

| | | | |
|---|---|---|---|
| 3,838,221 | 9/1974 | Schmidt et al. | 179/15 BS |
| 4,189,677 | 2/1980 | Cooper et al. | 325/321 |

(List continued on next page.)

FOREIGN PATENT DOCUMENTS

| | | |
|---|---|---|
| 0189695 | 6/1986 | European Pat. Off. |
| 0219085 | 4/1987 | European Pat. Off. |
| 0326104 | 2/1989 | European Pat. Off. |
| 3126333 | 5/1991 | Japan . |
| 3984485 | 9/1985 | WIPO . |
| 8700370 | 1/1987 | WIPO . |

(List continued on next page.)

OTHER PUBLICATIONS

Radio Equipment and Systems (RES); Digital European Cordless Telecommunications (DECT) Common interface services and facilities requirements specification, ETR 043, Jul. 1992.

(List continued on next page.)

Primary Examiner—Benedict V. Safourer
Attorney, Agent, or Firm—Lyon & Lyon LLP

[57] ABSTRACT

A simple and flexible over-air protocol for use with a mobile telephone system, having hand-held telephones in a micro cell or other type of cellular communication system. A method in which user stations communicate with one or more base stations to place and receive telephone calls, in which the user stations are provided a secure voice or data link and have the ability to handoff calls between base stations while such calls are in progress. Each base station has a set of "air channels" to which it transmits in sequence. The air channels supported by each base station are called that base station's "polling loop". A user station receives general polling information on an unoccupied air channel, transmits responsive information to the base station, and awaits acknowledgment from the base station. Each base station may therefore simultaneously maintain communication with as many user stations as there are air channels in its polling loop. The ability of a user station to communicate on any unoccupied air channel makes the protocol air-channel agile, while the stability of user station and base station clocks may define air channels, gaps, and minor frames.

In a preferred embodiment, a user station may communicate at an increased data rate by acquiring and communicating in multiple time slots that are either contiguous or non-contiguous within a time frame, or may communicate at a reduced data rate by communicating in alternating time frames or every N time frames.

20 Claims, 5 Drawing Sheets

U.S. PATENT DOCUMENTS

| | | | |
|---|---|---|---|
| 4,222,115 | 9/1980 | Cooper et al. | 375/1 |
| 4,247,942 | 1/1981 | Hauer | 375/25 |
| 4,280,222 | 7/1981 | Flower | 375/38 |
| 4,291,410 | 9/1981 | Caples | 375/1 |
| 4,301,530 | 11/1981 | Gutleber | 370/1 |
| 4,324,001 | 4/1982 | Rhodes | 375/90 |
| 4,355,411 | 10/1982 | Reudink et al. | 455/33 |
| 4,418,393 | 11/1983 | Zachiele | 364/724 |
| 4,418,425 | 11/1983 | Fennel et al. | 455/27 |
| 4,432,089 | 2/1984 | Wurzburg et al. | 370/110.1 |
| 4,455,651 | 6/1984 | Baran | 370/104 |
| 4,456,793 | 6/1984 | Baker et al. | 179/99 R |
| 4,479,226 | 10/1984 | Prabhu et al. | 375/1 |
| 4,484,028 | 11/1984 | Kelley et al. | 179/2 DP |
| 4,506,372 | 3/1985 | Massey | 375/116 |
| 4,525,835 | 7/1985 | Vance et al. | 370/29 |
| 4,538,281 | 8/1985 | Rajan | 375/206 |
| 4,561,089 | 12/1985 | Rouse et al. | 370/18 |
| 4,567,588 | 1/1986 | Jerrim | 370/18 |
| 4,587,662 | 5/1986 | Langewelpott | 375/1 |
| 4,601,047 | 7/1986 | Horwitz et al. | 375/2.2 |
| 4,612,637 | 9/1986 | Davis et al. | 370/95 |
| 4,621,365 | 11/1986 | Chiu | 375/1 |
| 4,630,283 | 12/1986 | Schiff | 375/1 |
| 4,653,069 | 3/1987 | Roeder | 380/31 |
| 4,658,096 | 4/1987 | West et al. | 379/59 |
| 4,672,658 | 6/1987 | Kavehrad et al. | 379/63 |
| 4,675,863 | 6/1987 | Paneth et al. | 370/50 |
| 4,680,785 | 7/1987 | Akiyama | 379/57 |
| 4,688,210 | 8/1987 | Eizenhofer et al. | 370/18 |
| 4,696,051 | 9/1987 | Breedon | 455/33 |
| 4,703,474 | 10/1987 | Foschini et al. | 370/18 |
| 4,718,080 | 1/1988 | Serrano et al. | 379/59 |
| 4,724,435 | 2/1988 | Moses et al. | 340/870.13 |
| 4,736,371 | 4/1988 | Tejima etl. | 370/95 |
| 4,742,512 | 5/1988 | Akashi et al. | 370/96 |
| 4,745,628 | 5/1988 | McDavid et al. | 375/39 |
| 4,748,655 | 5/1988 | Thrower et al. | 379/60 |
| 4,754,453 | 6/1988 | Eizenhofer | 370/95 |
| 4,763,325 | 8/1988 | Wolfe et al. | 370/348 |
| 4,765,753 | 8/1988 | Schmidt | 379/60 |
| 4,769,812 | 9/1988 | Shimizu | 370/67 |
| 4,797,947 | 1/1989 | Labedz | 455/33 |
| 4,804,938 | 2/1989 | Rouse et al. | 340/310 |
| 4,807,222 | 2/1989 | Amitay | 370/85 |
| 4,811,357 | 3/1989 | Betts | 375/1 |
| 4,815,106 | 3/1989 | Propp et al. | 375/36 |
| 4,817,089 | 3/1989 | Paneth et al. | 370/95 |
| 4,829,554 | 5/1989 | Barnes et al. | 379/58 |
| 4,833,702 | 5/1989 | Shitara et al. | 379/60 |
| 4,837,786 | 6/1989 | Gurantz et al. | 370/20 |
| 4,837,802 | 6/1989 | Higashiyama et al. | 379/62 |
| 4,866,732 | 9/1989 | Carey et al. | 375/1 |
| 4,868,795 | 9/1989 | McDavid et al. | 367/77 |
| 4,878,238 | 10/1989 | Rash et al. | 379/62 |
| 4,893,327 | 1/1990 | Stern et al. | 379/59 |
| 4,901,307 | 2/1990 | Gilhousen et al. | 370/18 |
| 4,905,221 | 2/1990 | Ichiyoshi | 370/95.1 |
| 4,912,705 | 3/1990 | Paneth et al. | 370/95.1 |
| 4,918,689 | 4/1990 | Hui | 370/85.9 |
| 4,918,690 | 4/1990 | Markkula et al. | 370/94 |
| 4,942,570 | 7/1990 | Kotzin et al. | 370/263 |
| 4,943,973 | 7/1990 | Werner | 375/1 |
| 4,953,197 | 8/1990 | Kaewell, Jr. | 379/58 |
| 4,972,431 | 11/1990 | Keegan | 375/1 |
| 4,979,170 | 12/1990 | Gilhousen et al. | 370/104.1 |
| 4,984,247 | 1/1991 | Kaufmann et al. | 375/1 |
| 4,995,083 | 2/1991 | Baker | 380/23 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,016,261 | 5/1991 | Amoroso et al. | 375/76 |
| 5,018,165 | 5/1991 | Sohner et al. | 375/1 |
| 5,022,024 | 6/1991 | Paneth et al. | 370/50 |
| 5,022,046 | 6/1991 | Morrow | 375/1 |
| 5,022,047 | 6/1991 | Dixon et al. | 375/1 |
| 5,025,452 | 6/1991 | Sohner et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,056,109 | 10/1991 | Gilhousen et al. | 375/1 |
| 5,066,957 | 11/1991 | Mizuno et al. | 342/352 |
| 5,073,899 | 12/1991 | Collier et al. | 375/1 |
| 5,073,900 | 12/1991 | Mallinkdrodt | 375/1 |
| 5,081,642 | 1/1992 | O'Clock et al. | 375/1 |
| 5,093,637 | 3/1992 | Isota et al. | 332/103 |
| 5,093,840 | 3/1992 | Schilling | 375/1 |
| 5,097,484 | 3/1992 | Akaiwa | 375/40 |
| 5,101,501 | 3/1992 | Gilhousen et al. | 455/33 |
| 5,103,459 | 4/1992 | Gilhousen et al. | 375/1 |
| 5,107,225 | 4/1992 | Wheatley et al. | 330/279 |
| 5,109,390 | 4/1992 | Gilhousen et al. | 375/1 |
| 5,109,393 | 4/1992 | Saegusa | 375/108 |
| 5,111,535 | 5/1992 | Tokunaga | 455/33.2 |
| 5,117,423 | 5/1992 | Shepherd et al. | 370/95.1 |
| 5,119,375 | 6/1992 | Paneth et al. | 370/95.1 |
| 5,121,391 | 6/1992 | Paneth et al. | 370/95.1 |
| 5,127,042 | 6/1992 | Gillig et al. | 379/59 |
| 5,153,598 | 10/1992 | Alves, Jr. | 342/352 |
| 5,157,686 | 10/1992 | Omura et al. | 375/1 |
| 5,164,958 | 11/1992 | Omura | 375/1 |
| 5,166,929 | 11/1992 | Lo | 370/85.3 |
| 5,166,952 | 11/1992 | Omura et al. | 375/1 |
| 5,170,412 | 12/1992 | Massey | 375/1 |
| 5,177,765 | 1/1993 | Holland et al. | 375/1 |
| 5,177,766 | 1/1993 | Holland et al. | 375/1 |
| 5,179,571 | 1/1993 | Schilling | 375/1 |
| 5,185,610 | 2/1993 | Ward et al. | 342/357 |
| 5,191,597 | 3/1993 | Ekelund et al. | 375/60 |
| 5,193,101 | 3/1993 | McDonald et al. | 375/1 |
| 5,195,090 | 3/1993 | Bolliger et al. | 370/94.1 |
| 5,195,091 | 3/1993 | Farwell et al. | 370/94.1 |
| 5,200,956 | 4/1993 | Pudney et al. | 370/95.1 |
| 5,202,901 | 4/1993 | Chennakeshu | 375/84 |
| 5,206,882 | 4/1993 | Schloemer | 375/1 |
| 5,210,771 | 5/1993 | Schaeffer et al. | 375/1 |
| 5,212,689 | 5/1993 | Eriksson | 370/106 |
| 5,212,724 | 5/1993 | Nazarenko et al. | 379/58 |
| 5,216,691 | 6/1993 | Kaufmann | 375/1 |
| 5,218,618 | 6/1993 | Sagey | 375/1 |
| 5,224,120 | 6/1993 | Schilling | 375/1 |
| 5,228,053 | 7/1993 | Miller et al. | 375/1 |
| 5,229,995 | 7/1993 | Strawczynski et al. | 370/95.3 |
| 5,235,615 | 8/1993 | Omura | 375/1 |
| 5,239,545 | 8/1993 | Buchholz | 370/95.3 |
| 5,239,572 | 8/1993 | Saegusa et al. | 379/61 |
| 5,241,690 | 8/1993 | Larsson et al. | 455/54.1 |
| 5,243,641 | 9/1993 | Evans et al. | 379/61 |
| 5,253,268 | 10/1993 | Omura et al. | 375/1 |
| 5,257,283 | 10/1993 | Gilhousen et al. | 375/1 |
| 5,260,987 | 11/1993 | Mauger | 379/58 |
| 5,263,045 | 11/1993 | Schilling | 375/1 |
| 5,263,047 | 11/1993 | Kotzin et al. | 375/1 |
| 5,265,119 | 11/1993 | Gilhousen et al. | 375/1 |
| 5,267,261 | 11/1993 | Blakeney et al. | 375/1 |
| 5,267,262 | 11/1993 | Wheatley | 375/1 |
| 5,274,665 | 12/1993 | Schilling | 375/1 |
| 5,278,833 | 1/1994 | Crisler et al. | 370/348 |
| 5,278,835 | 1/1994 | Ito et al. | 370/95.3 |
| 5,280,472 | 1/1994 | Gilhousen et al. | 370/18 |
| 5,280,537 | 1/1994 | Sugiyama et al. | 375/1 |
| 5,283,815 | 2/1994 | Chennakeshu | 375/84 |
| 5,285,469 | 2/1994 | Vanderpool | 375/1 |
| 5,289,497 | 2/1994 | Jacobson et al. | 375/1 |
| 5,291,475 | 3/1994 | Bruckert | 370/95.1 |
| 5,291,516 | 3/1994 | Dixon et al. | 375/1 |
| 5,299,198 | 3/1994 | Kay et al. | 370/95.3 |
| 5,299,226 | 3/1994 | Schilling | 375/1 |
| 5,303,286 | 4/1994 | Wiedeman | 379/59 |
| 5,303,287 | 4/1994 | Laborde | 379/59 |

| | | | |
|---|---|---|---|
| 5,313,457 | 5/1994 | Hostetter et al. | 370/18 |
| 5,313,467 | 5/1994 | Varghese et al. | 370/468 |
| 5,319,634 | 6/1994 | Bartholomew et al. | 370/18 |
| 5,327,577 | 7/1994 | Uddenfeldt | 455/33.2 |
| 5,345,469 | 9/1994 | Fulghum | 375/205 |
| 5,345,498 | 9/1994 | Mauger | 379/58 |
| 5,351,269 | 9/1994 | Schilling | 375/1 |
| 5,353,303 | 10/1994 | Walthall | 375/1 |
| 5,375,140 | 12/1994 | Bustamante et al. | 375/1 |
| 5,376,894 | 12/1994 | Petranovich | 329/306 |
| 5,377,192 | 12/1994 | Goodings et al. | 370/95.3 |
| 5,383,219 | 1/1995 | Wheatley et al. | 375/1 |
| 5,392,459 | 2/1995 | Baba et al. | 455/69 |
| 5,398,247 | 3/1995 | Delprat et al. | 370/95.3 |
| 5,402,413 | 3/1995 | Dixon et al. | 370/18 |
| 5,410,568 | 4/1995 | Schilling | 375/205 |
| 5,414,796 | 5/1995 | Jacobs et al. | 395/2.3 |
| 5,416,779 | 5/1995 | Barnes et al. | 370/29.1 |
| 5,416,797 | 5/1995 | Gilhousen et al. | 375/705 |
| 5,418,838 | 5/1995 | Havermans et al. | 379/60 |
| 5,420,851 | 5/1995 | Seshadri et al. | 370/29 |
| 5,422,930 | 6/1995 | McDonald et al. | 379/58 |
| 5,430,760 | 7/1995 | Dent | 375/200 |
| 5,434,859 | 7/1995 | Levardon | 370/84 |
| 5,434,888 | 7/1995 | Fukuchi | 375/307 |
| 5,438,329 | 8/1995 | Gastouniotis et al. | 340/870.02 |
| 5,440,613 | 8/1995 | Fuentes | 379/60 |
| 5,444,696 | 8/1995 | Petranovich | 370/17 |
| 5,454,028 | 9/1995 | Hara et al. | 379/61 |
| 5,455,822 | 10/1995 | Dixon et al. | 370/18 |
| 5,467,367 | 11/1995 | Izumi et al. | 375/206 |
| 5,479,400 | 12/1995 | Dilworth et al. | 370/60 |
| 5,481,533 | 1/1996 | Honig et al. | 370/18 |
| 5,483,676 | 1/1996 | Mahany et al. | 455/67.4 |
| 5,487,083 | 1/1996 | Nakajima et al. | 375/200 |
| 5,490,136 | 2/1996 | Sereno et al. | 370/18 |
| 5,490,203 | 2/1996 | Jain et al. | 379/59 |
| 5,497,424 | 3/1996 | Vanderpool | 380/34 |
| 5,506,837 | 4/1996 | Söllner et al. | 370/11 |
| 5,509,015 | 4/1996 | Tiedemann | 370/95.3 |
| 5,511,067 | 4/1996 | Miller | 370/18 |
| 5,515,378 | 5/1996 | Roy, III et al. | 370/95.1 |
| 5,521,925 | 5/1996 | Merakos et al. | 370/95.3 |
| 5,528,597 | 6/1996 | Gerszberg et al. | 370/95.3 |
| 5,530,700 | 6/1996 | Tran et al. | 370/95.1 |
| 5,537,458 | 7/1996 | Suomi et al. | 370/95.1 |
| 5,546,380 | 8/1996 | Tomasi et al. | 370/17 |
| 5,555,260 | 9/1996 | Rinnbäck et al. | 370/84 |
| 5,592,468 | 1/1997 | Sato | 370/252 |

FOREIGN PATENT DOCUMENTS

| | | |
|---|---|---|
| 93155573 | 8/1993 | WIPO . |
| 9318596 | 9/1993 | WIPO . |
| 9318601 | 9/1993 | WIPO . |
| 9406217 | 3/1994 | WIPO . |
| 9501018 | 1/1995 | WIPO . |
| 9503652 | 2/1995 | WIPO . |
| 9512938 | 5/1995 | WIPO . |
| 9512943 | 5/1995 | WIPO . |

OTHER PUBLICATIONS

Radio Equipment and Systems (RES); Digital European Cordless Telecommunications (DECT) Common interface Part 9: Public access profile, ETS 300 175–9, Oct. 1992.

Campbell, Colin K., *Applications of Surface Acoustice and Shallow Bulk Acoustic Wave Devices*, Proc. of the IEEE, pp. 1453–1484, Oct. 1989.

Kavehrad, M. et al., *Performance of Low–Complexity Channel Coding and Diversity for Spread Spectrum in Indoor, Wireless Communication*, AT&T Tech. Journal, 64(8):1927–1965, Oct. 1985.

Kavehrad, M. et al., *Spread Spectrum for Indoor Digital Radio*, IEEE Comm. Mag., 25(5):32–40, Jun. 1987.

Kavehrad, Mohsen et al., *Direct Sequence Spread Spectrum with DPSK Modulation and Diversity for Indoor Wireless Communications*, IEEE Trans. on Comms., Com–35(2):224–226, Feb. 1987.

Sust, M. K. et al., *All Digital Signal Processing In A Spread Spectrum Communication System*, Proc. of Melecon '87, pp. 157–161, Mar. 24–26, 1987.

Unkauf, Manfred G., *Surface Wave Devices in Spread Spectrum Systems*, Surface Wave Filters, pp. 477–509 (Wiley 1977).

In the Matter of : Omnipoint Corporation, Oracle Data Publishing, Inc., and McCaw Cellular Comunications, Inc.—Request for a Pioneer's Preference, Dated: May 4, 1992.

Collins, J.H. et al., *The Role of Surface Acoustic Wave Technology in Communication Systems*, Ultrasonics, Mar. 1972, vol. 10, No. 2, pp. 59–71.

Saleh, Adel A.M. et al., *An Experimental TDMA Indoor Radio Communications System Using Slow Frequency Hopping and Coding*, IEEE Transactions on Communications, Jan. 1991, vol. 39, No. 1, pp. 152–161.

GSM Specification 05.10, Oct. 1992.

Dixon, Robert C., *Spread Spectrum Systems*, (J. Wiley & Sons, 2d ed. 1984).

Radio Equipment and Systems Digital European Cordless Telecommunications (DECT) Reference document (ETSI, ETR 015, Mar. 1991).

European Digital Cellular Telecommunications System (Phase 1); Mobile Station—Base Station System (MS–BSS) Interface Data Link Layer Specification (ETSI, I–ETS 300 021, May 1992).

European Digital Cellular Telecommunications System (Phase 1); MS–BSS Layer 1—General Requirements (ETSI, I–ETS 300 078, May 1992).

Mohanty, Nirode C., *Spread Spectrum and Time Division Multiple Access Satellite Communications*, IEEE Transactions on Communications, vol. Com–25, No. 8, Aug. 1977, pp. 810–815.

In the Matter of: Amendment of the Commissions' Rules to Establish New Personal Communications Services—*Adelphia Comm. Corp.—Satcom, Inc.* Dated: Jun. 25, 1992.

In the Matter of: Request of Omnipoint Communications, Inc. For a Pioneer's Preference in the Licensing Process for Personal Communications Services—*Request for a Pioneer's Preference* Dated: May 4, 1992.

Omnipoint Corporation *Progress Report*—(Submitted with respect to Omnipoint's 1850–2200MHz Experimental License KK2XCV, File No. 2174–EX–PL–91) Dated: Jul. 8, 1992.

Omnipoint Corporation—*FCC Experimental License Semi–annual Progress Report* Apr. 1992.

Omnipoint Corporation—*FCC Experimental License Semi–annual Progress Report Rev. 01* May 1992.

Nanda, Sanjiv et al., "Variable Partition Duplexing For Wireless Communications," IEEE, GlobeCom '91:1147–1153, 1991.

"Air Interface Considerations," Joint Experts Meeting, Rockwell International Nov. 9, 1992.

Ritter, Gerhard, *Response to Proposal for FQPSK Modulation in DCS 1900*, Joint Technical Committee Standardisation of the PCS Air Interface, Feb. 7, 1994.

METHOD AND SYSTEM FOR DATA LINK EXPANSION OR CONTRACTION USING SPREAD SPECTRUM TDMA COMMUNICATION

RELATED APPLICATION DATA

This is a continuation of copending application Ser. No. 08/284,053 filed on Aug. 1, 1994 which is a continuation-in-part of co-pending U.S. application Ser. No. 08/215,306 filed on Mar. 21, 1994, and entitled "P C S POCKET PHONE/MICRO CELL COMMUNICATION OVER-AIR PROTOCOL," now abandoned, which is in turn a continuation-in-part of U.S. application Ser. No. 08/146,496 filed on Nov. 1, 1993, bearing the same title, and now abandoned.

BACKGROUND OF THE INVENTION

1. Field of the Invention

This invention relates to the field of communications, and particularly to communication systems using spread spectrum techniques and to over-the-air protocols for mobile telephones.

2. Description of Related Art

A mobile telephone system may generally comprise a set of "user stations", typically mobile and the endpoints of a communication path, and a set of "base stations", typically stationary and the intermediaries by which a communication path may be established or maintained. In a mobile telephone system, one important concern is the ability of mobile stations to communicate with base stations in a simple, flexible and rapid manner. The communication protocol between user stations and base stations should be rapid, so that user stations are not required to wait to establish a communication path. The protocol should be simple, so that user stations need not incorporate expensive equipment to implement it. The protocol should be flexible, so that user stations may establish communication paths in as many communication environments as reasonably possible.

Accordingly, it would be advantageous to provide a simple and flexible over-air protocol for use with a mobile telephone system. One class of systems in which this would be particularly advantageous is that of personal communication systems, particularly those with hand-held telephones in a micro cell or other type of cellular communication system.

SUMMARY OF THE INVENTION

The invention provides in one aspect a simple and flexible over-air protocol for use with a mobile telephone system, such as a Personal Communication System (PCS) with hand-held telephones in a cellular communication system. A preferred embodiment is adapted to "pocket phones", i.e., small hand-held telephones which may use a cellular communication technique, but the invention may be used with any cellular or mobile telephone system. The protocol defines a method in which user stations, such as cellular or mobile telephone handsets, communicate with one or more base stations to place and receive telephone calls. The protocol provides air-channel agility between base stations and user stations, while providing a secure voice or data link and the ability to handoff calls between base stations while they are in progress.

In a preferred embodiment, each base station may have a set of "air channels" which it polls, e.g. by transmitting to each one in sequence. The air channels supported by each base station are referred to as a "polling loop" for a particular base station. A user station may receive information on an unoccupied air channel, receive the base station's transmission, and transmit information to the base station. Each base station may therefore simultaneously maintain communication with as many user stations as there are air channels in its polling loop. The ability of a user station to communicate on any unoccupied air channel makes the protocol air-channel agile. Each base station continually transmits on each one of its air channels in a predetermined sequence. Each base station transmission may be followed by a first gap, a user station transmission (if some user station attempts to communicate), and a second gap, before the base station transmits on the next air channel. A base station transmission, first gap, user station transmission, and second gap are collectively called a "minor frame". A polling loop in which each air channel is polled is called a "major frame".

In a preferred embodiment, stability of user station and base station clocks may define the air channels, gaps, and minor frames. The user station may synchronize itself to the base station's clock by detecting a minor frame and by adjusting its clock to be in synchrony with the base station when the first bit sequence of the minor frame is detected. The stability of the user station and base station clocks may then hold the user station and base station in synchronization, as long as the user station is periodically able to receive transmissions from the base station. Should reception in either direction be interrupted for too long, the base station and user station clocks may drift apart and the user station may need to re acquire the transmission from the base station.

Handoffs are preferably initiated from the user station which continually monitors available air channels from the same and competing base stations during dead time. A user station may handoff within the same polling loop to establish communication in a new minor frame, or may handoff in such a manner to establish communication in a new minor frame within a polling loop of a different base station. In the latter case, a base station controller may assist in transferring the call from one base station to another.

The invention provides in yet another aspect for closed loop power control in the user stations by monitoring and adjusting the user station power at regular intervals, such as once in each major frame. The control of user station power serves to reduce intercell interference and prolong battery life in mobile handsets.

Variable data rates provided in another aspect of the present invention. A user station may increase its data rate are by transmitting and/or receiving in multiple minor frames during a major frame, or may reduce its data rate by transmitting and/or receiving in fewer than every major frame.

DESCRIPTION OF THE PREFERRED EMBODIMENT

The disclosure of the invention may be supplemented by the contents of technical information appended to this specification in a Technical Appendix A, a Technical Appendix B, and a Technical Appendix C, each of which is hereby incorporated by reference as if fully set forth herein. No admission is made as to possible prior art effect of any part of the appendix.

In a preferred embodiment, it is contemplated that communication between base stations and user stations will be conducted using a spread-spectrum technique. There are at least three methods for establishing synchronization and communication, each preferably using an M-ary technique in which multiple bits of data are transmitted for each spread-spectrum symbol, e.g., by transmitting and receiving multiple different spreading codes, and interpreting the received one of those multiple different spreading codes at the receiver to indicate multiple data bits. Synchronization may be accomplished either by (1) automatic synchronization disclosed in co-pending application Ser. No. 08/146/491, entitled "DESPREADING/DEMODULATING DIRECT SEQUENCE SPREAD SPECTRUM SIGNALS", Lyon & Lyon Docket No. 200/154, filed on Nov. 1, 1993 in the name of inventors Robert Gold and Robert C. Dixon, hereby incorporated by reference, by (2) synchronizing with matched filters, by (3) demodulation and despreading using sliding correlators, or by (4) a combination of these techniques, e.g., matched filters for synchronization plus sliding correlators for demodulation and despreading, or matched filters for synchronization plus auto synchronization for demodulation and despreading.

Figure 1A:
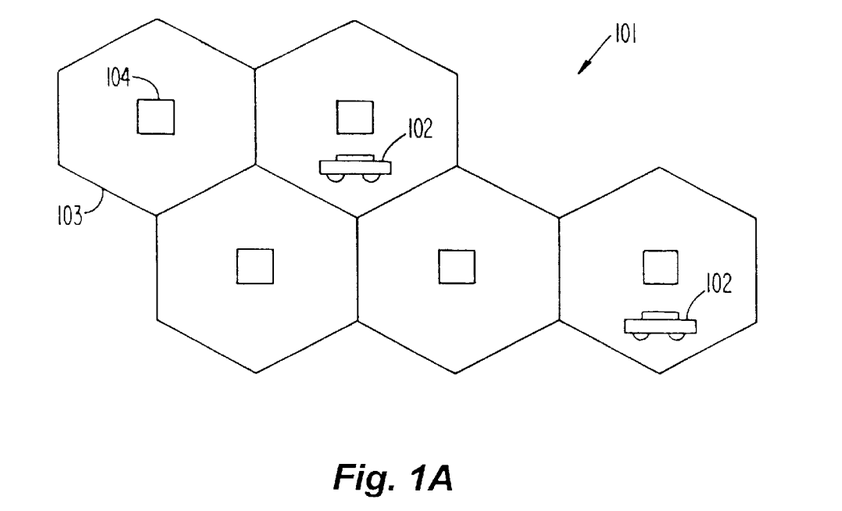
FIG. 1A is a diagram of a communication system having base stations and user stations.

FIG. 1A is a diagram of a communication system having base stations and user stations.

A communication system 101 for communication among a plurality of user stations 102 may include a plurality of cells 103, each with a base station 104, typically located at the center of the cell 103. Each station (both the base stations 104 and the user stations 102) may generally comprise a receiver and a transmitter. The user stations 102 and base stations 104 preferably communicate using time division multiple access (TDMA) or time division duplex (TDD) techniques as further described herein, in which specified time segments or major frames are divided into assigned time slots or minor frames for individual communication.

Figure 1B:
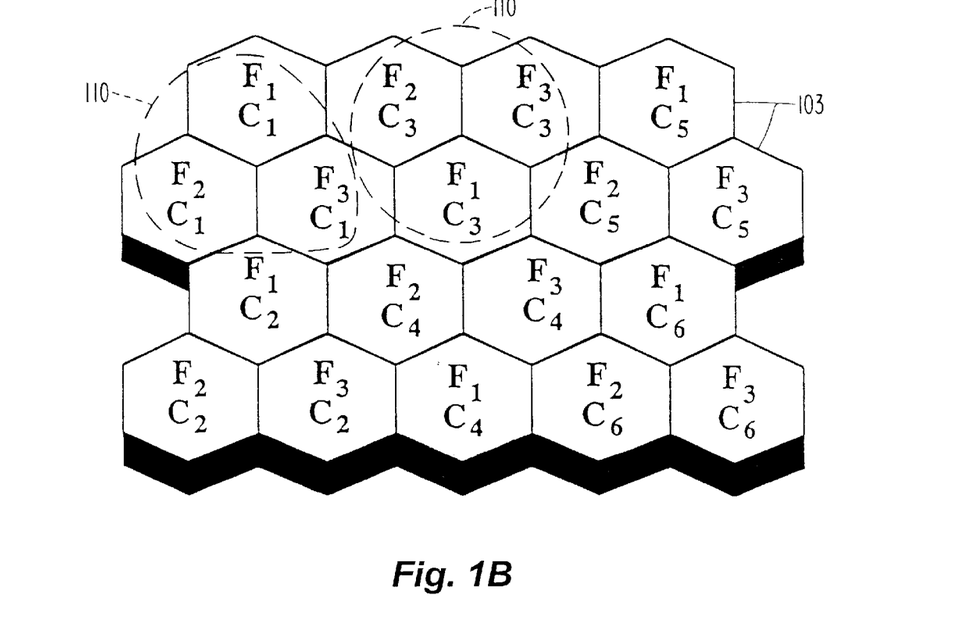
FIG. 1B is a diagram of a preferred cellular environment in which the invention may operate.

FIG. 1B is a diagram of a preferred cellular environment in which the invention may operate. A geographical region is divided into a plurality of cells 103. Associated with each cell 103 is an assigned frequency and an assigned spread spectrum code. Preferably, three different frequencies F1, F2 and F3 are assigned in such a manner that no two adjacent cells have the same assigned frequency F1, F2 or F3. The effect of such a frequency reuse pattern is to minimize interference between adjacent cells.

To further reduce the possibility of intercell interference, different orthogonal spread spectrum codes C1 through C6 are assigned as shown in adjacent clusters 110. Although six spread spectrum codes C1 through C6 are shown in FIG. 1B, it is contemplated that fewer or more spread spectrum codes may be suitable depending upon the particular information. Further information regarding a preferred cellular environment may be found in U.S. application Ser. No. 07/682,050 entitled "Three Cell Wireless Communication System" filed on Apr. 8, 1991 in the name of Robert C. Dixon, and hereby incorporated by reference as if fully set forth herein.

The use of spread spectrum for carrier modulation permits a very efficient frequency reuse factor of N=3 for allocating different carrier frequencies F1, F2 and F3 to adjacent cells 103. Interference between cells 103 using the same carrier frequency F1, F2 or F3 is reduced by the propagation loss due to the distance separating the cells 103 (no two cells 103 using the same frequency F1, F2 or F3 are less than two cells 103 in distance away from one another), and also by the spread spectrum processing gain of cells 103 using the same carrier frequencies F1, F2 or F3.

The preferred spread spectrum bandwidth may differ according to the frequency band of operation. When operating in the PCS A, B, or C frequency bands, each of which is 15 MHz wide, the center frequencies F1, F2 and F3 are preferably located at 2.5 MHz, 7.5 MHZ, and 12.5 MHz, respectively, from the lowest band edge of the A, B or C frequency band.

The PCS D, E, or F bands, on the other hand, are each 5 MHz wide, which is the same bandwidth as a preferred spreading bandwidth for a spread spectrum signal used in the particular cellular environment. Consequently, a single carrier frequency is placed in the center of the D, E or F band, and a frequency reuse factor of N=1 is used because the spread spectrum signal covers the entire available bandwidth. Because an N=1 frequency reuse pattern is used, the required intercell interference rejection must be obtained by spread spectrum code orthogonality and/or the use of sectorized antenna patterns. The exchange of interfering air channels or time slots, as described elsewhere herein, may also be used to mitigate intercell interference.

When operating in the PCS unlicensed band, which has a bandwidth of 20 MHz divided into individual channel only 1.25 MHz wide, the spread spectrum chipping rate may be reduced to approximately 1.25 Mcps. The TDMA burst rate, or number of TDMA time slots (or minor frames) in each polling loop, may also be reduced to maintain the required spread spectrum processing gain for rejecting intercell interference. A non-spread spectrum TDMA/TDD signal modulation format for operation in the unlicensed band may also be provided.

Figure 1C:
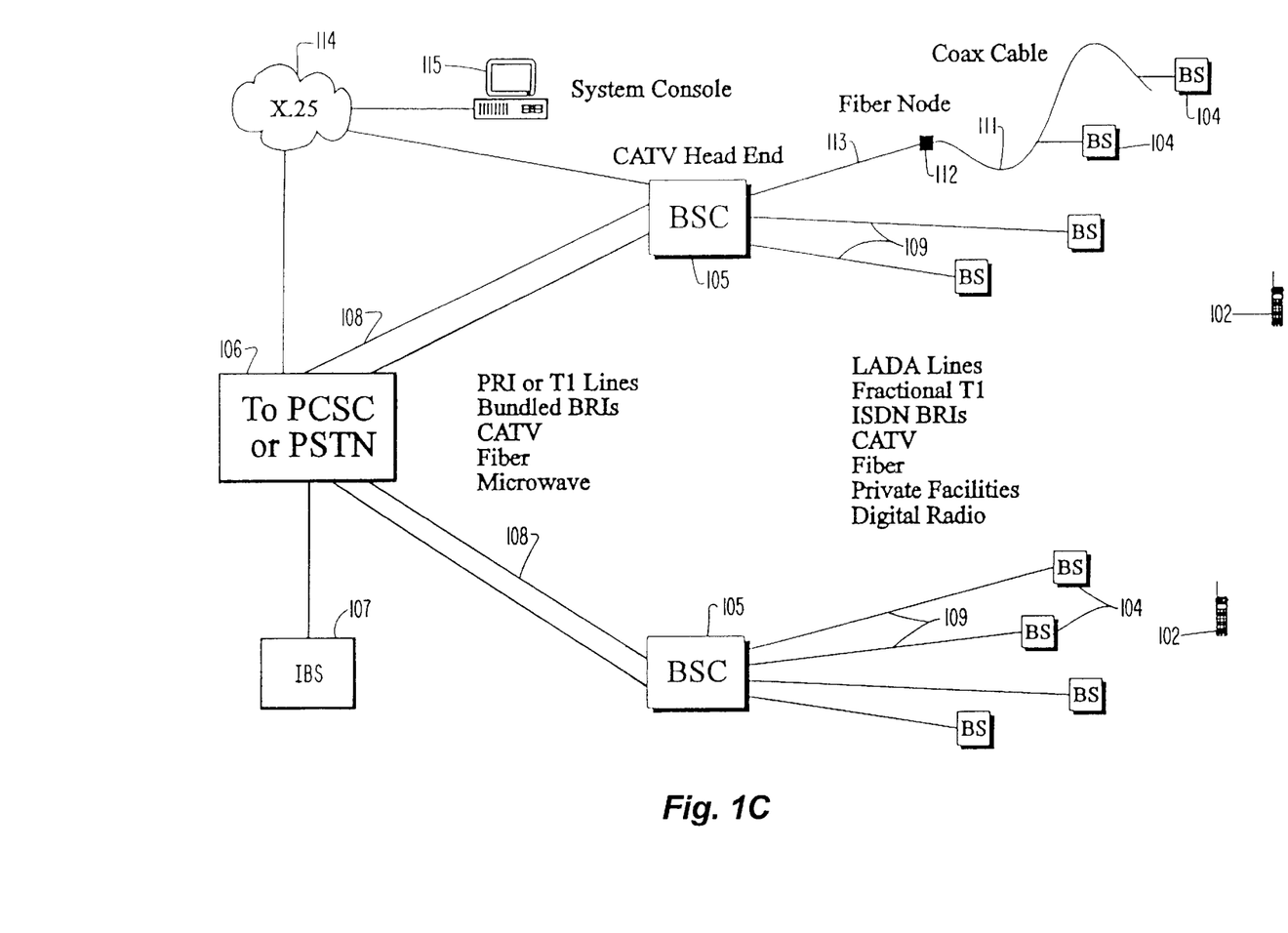
FIG. 1C is a diagram of a network architecture showing various system components.

FIG. 1C is a diagram of a network architecture showing various system components.

A preferred communication system is designed around an object-based software architecture which allows for flexibility in interconnection to various networks including public switched telephone networks, AIN, GSM and IS-41 network infrastructures. It is also contemplated that the communication system may interface with a cable television distribution network; however, such an interface may require the addition to the cable television network of a switch architecture, two-way amplifiers, redundancy, and, in order to use the coaxial portion of the cable TV network, a remote antenna subsystem to extend coverage from a base station 104.

The overall system thus provides flexibility to interface with a variety of different networks depending upon the desired application. To allow interconnection to diverse networks, the system uses internal communications based on ISDN messages, called "notes", for passing necessary information among components within the system. These "notes" are so named as not to confuse them with the ISDN specific protocol itself. Network messages (based on, e.g., Q.921, Q.931 protocols, or others) are converted by the system into "notes" for efficient operation within the hardware platform.

In FIG. 1C is shown various components of a preferred system architecture including a plurality of base stations 104 for communicating with user stations 102. Each base station 104 may be coupled to a base station controller 105 by any of a variety of linking means 109 including, for example, local area data access (LADA) lines, T1 or fractional T1 lines, ISDN BRI's, cable TV lines, fiber optic cable, digital radio, microwave links, or private lines. As an illustration shown in FIG. 1C, a plurality of base stations 104 may be coupled to base station controller 105 by first connecting to a coaxial cable 111 which is thereafter coupled to a fiber optic cable 113 at a fiber node 112. The fiber optic cable 113 is coupled to the base station controller 105 as shown.

Each base station controller 105 may be connected to a network 106 such as a public switched telephone network (PSTN) or a personal communications system switching center (PCSC) by a variety of network links 108, which include the same basic categories of transport means as the linking means 109. Base station controllers 105 may also connect to the network 106 via an X.25 link 114.

The system of FIG. 1C also incorporates the use of "intelligent" base station (IBS) 107 compatible with LEC-based AIN architecture that may be connected directly to a network 106 without the interface of a base station controller 105. The intelligent base stations 107 may therefore bypass the base station controllers 105 for local handoffs and switching, and instead perform these functions via the network 106. In AIN based architectures, signaling between network elements may be carried out using standard signaling protocols including, for example, SS7 and IS-41.

In operation, the base stations 104 format and send digital information to the base station controller 105 (or directly to the network 106 in the case of an intelligent base station 107). The base station controllers 105 concentrate inputs from multiple base stations 104, assist handoffs between base stations 104, and convert and format channel information and signaling information for delivery to the network 106. The base station controllers 105 may also manage a local cache VLR database, and may support basic operations, administration and management functions such as billing, monitoring and testing. Each base station controller 105, under control of the network 106, may manage local registration and verification of its associated base stations 104 and may provide updates to the network 106 regarding the status of the base stations 104.

The network 106 connects to the base station controllers 105 for call delivery and outgoing calls. The connection between the network 106 and a base station controller 105 may utilize the Bellcore "Generic C" interface which includes Q.921, Q.931 and modifications to Q.931.

Intelligent base stations 107 may use ISDN messaging for registration, call delivery and handoff over a public telephone switch. The intelligent base station 107 may have all the general capabilities of a base station 104 but further incorporate a BRI card, additional intelligence and local vocoding. The connection between the network 106 and an intelligent base station 107 may utilize the Bellcore "Generic C" interface which includes Q.921, Q.931 and modifications to Q.931.

If the network 106 is a GSM network, then base stations 104 may connect to the network 106 through a defined "A" interface. Features and functionality of GSM are passed to and from the base stations 104 over the "A" interface in a manner that is transparent to the end user.

As noted, the system may also interconnect to cable television distribution networks. The base stations 104 may be miniaturized to the point where they can be installed inside standard cable TV amplifier boxes. Interfacing may be carried out using analog remote antenna systems and digital transport mechanisms. For example, T1 and FT1 digital multiplexer outputs from the cable TV network may be used for interfacing, and basic rate (BRI) ISDN links to transport digital channels.

Cell site diagnostics may be performed remotely through either the control channel on the digital link resident in the base station 104 or a dial up modem for some implementations. Such diagnostics may be performed on each component board of the base station 104. In addition, the base stations 104 and base station controllers 105 may be remotely monitored and downloaded with updated software as required. Similarly, user stations 102 can also be downloaded with software over air channels as required for maintenance purposes or for system upgrades.

The user stations 102 comprise in one embodiment mobile handsets capable of multi-band and/or multi-mode operation. The user stations 102 may be multi-mode in that they may be capable of either spread spectrum communication or conventional narrowband communication. The user stations 102 may be multiband in the sense that they may be set to operate on a plurality of different frequencies, such as frequencies in either the licensed or unlicensed frequency bands.

For example, a user station 102 may be set to operate on any frequency between 1850 and 1990 MHz in 625 kHz steps. Thus, each user station 102 may have a frequency synthesizers which can be programmed to receive and transmit on any one of 223 frequencies. If the user station 102 operates solely in the licensed PCS band, however, the programmable frequency steps may be in 5 MHz increments, in which case the first channel may be centered at 1852.5 MHz, the next at 1857.5 MHz, and so on. If operating in the isochronous band between 1920 and 1930 MHz, the first channel may be centered at 1920.625 MHz, and the channel spacing may be 1.25 MHz across the remainder of the isochronous band. The user stations 102 need not operate in the 1910 to 1920 MHz band, which is reserved for asynchronous unlicensed devices.

Further detail regarding the multi-band and multi-mode aspects of user stations 102 may be found in copending U.S. application Ser. No. 08/146,492 filed on Nov. 1, 1993 in the name of inventors Robert C. Dixon and Jeffrey S. Vanderpool, entitled "DUAL-MODE WIRELESS UNIT WITH TWO SPREAD-SPECTRUM FREQUENCY BANDS," copending application Ser. No. 08/059,021 filed May 4, 1993 in the name of inventors Douglas G. Smith, Robert C. Dixon and Jeffrey S. Vanderpool, entitled "DUAL-BAND SPREAD-SPECTRUM COMMUNICATION," and copending application Ser. No. 08/206,045 filed on Mar. 1, 1994 in the name of inventors Robert C. Dixon and Jeffrey S. Vanderpool, entitled "DUAL-MODE TRANSMITTER AND RECEIVER," each of which is hereby incorporated by reference as if fully set forth herein. The multi-band, multi-mode capability enables the user stations 102 take advantage of variety of diverse system architectures as described herein, and to interface with various different networks with a minimum of hardware or software adjustments.

Base stations 104, like user stations 102, may also be provided with multi-band and multi-mode capabilities as described above.

FRAME AND MESSAGE FORMATS

Figure 2:
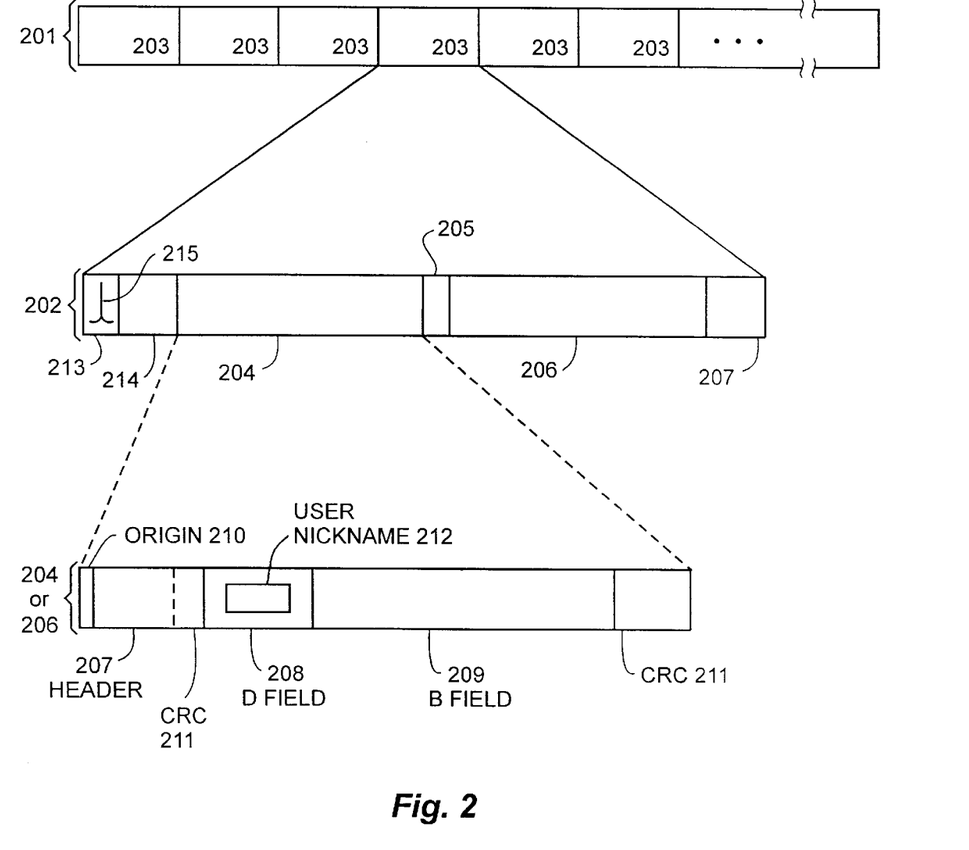
FIG. 2 is a diagram of frame and message formats in a polling loop.

FIG. 2 shows frame and message formats in a polling loop.

In a single cell 103, a base station 104 may poll user stations 102 in the cell 103. The base station 104 may repeatedly transmit a major frame 201, comprising a sequence of minor frames 202. As noted herein, each minor frame 202 may comprise a polling exchange for a single user station 102, while each major frame 201 may comprise a complete polling sweep of user stations 102 in the cell 103.

In a preferred embodiment, the base station 104 may conduct its polling exchanges using a set of air channels 203. Each of the air channels 203 may comprise a separate transmission channel, such as a separate frequency band for FM or AM encoding, a separate spreading code for spread-spectrum encoding, a separate spatial location, or other division of communication slots between base stations 104 and user stations 102. In a preferred embodiment, the base station 104 may poll every one of its air channels 203 in a predetermined sequence in a single major frame 201.

While in a preferred embodiment, the base station 104 may poll every one of its air channels 203 in a single major frame 201, but it will be clear to those of ordinary skill in the art, after perusal of this application, that the base station 104 may restrict its poll to only a portion of its air channels 203 in each major frame 201, so long as all air channels 203 are eventually polled, and in an order so that each user station 102 may determine in which minor frame 202 it should respond.

Each minor frame 202 may comprise a base transmission 204 by the base station 104, a first gap 205, a user transmission 206 by a user station 102 (if any user station 102 responds), and a second gap 207. During the base transmission 204, a user station 102 desiring to establish a communication path may receive the base transmission 204 and determine if the air channel 203 is occupied or not. If not occupied, the user station 102 may respond with its user transmission 206.

In one embodiment, in order to provide efficient service in low density rural areas, cell radii can be extended to large distances (e.g., beyond 8 miles) by providing the increased guard times as would be required for the longer round trip propagation delays encountered in the larger cells. Cells with large radii can be supported by reducing the number of minor frames 202 per major frame 201 to a lesser number (e.g., from 32 to 25). Since such large cell radii will ordinarily be deployed in low population density areas, reduced cell capacity caused by the smaller number of minor frames 202 per major frame 201 is not a severe drawback.

In a preferred embodiment, a base transmission 204 may comprise a header field 207, which may be a fixed length of sixteen bits, a D field 208, which may be a fixed length of eight bits, and a B field 209, which may be a fixed length of 160 bits, or may be a variable length. In an embodiment using a variable-length B field 209, the variable length may be determined in response to the polling loop time and the data rate which must be supported. For example, in a preferred embodiment of a 30-channel system, the B field 209 may be 160 bits long.

In a preferred embodiment, the user transmission 206 may comprise like fields as the base transmission 204.

The header field 207 may comprise an origin bit 210, which may be a "1", bit for base transmissions 204 and may be a "0" bit for user transmissions 206. Other parts of the header field 207 may indicate information about the base transmission 204 or user transmission 206 itself, e.g., what type of message the base transmission 204 or user transmission 206 comprises. The header field 207 may also comprise a CSC or CRC code 211 (a cyclic redundancy check) having four bits.

The D field 208 may comprise control information to be communicated between base stations 104 and user stations 102 once a communication link is established. This control information may generally be used for ISDN communication between base stations 104 and user stations 102, such as control information generally communicated using the ISDN "D channel". Because the D field 208 is separate from but simultaneous with the B field 209 which normally handles the bulk of information transfer due to its higher data rate, the D field 208 may be used for paging applications, notifications (e.g., voice mail), short message service (similar to GSM), or other user applications. Thus, the simultaneous nature of the D field 208 and the B field 209 allows messaging functions even when the user station 102 is "in use".

Figure 3:
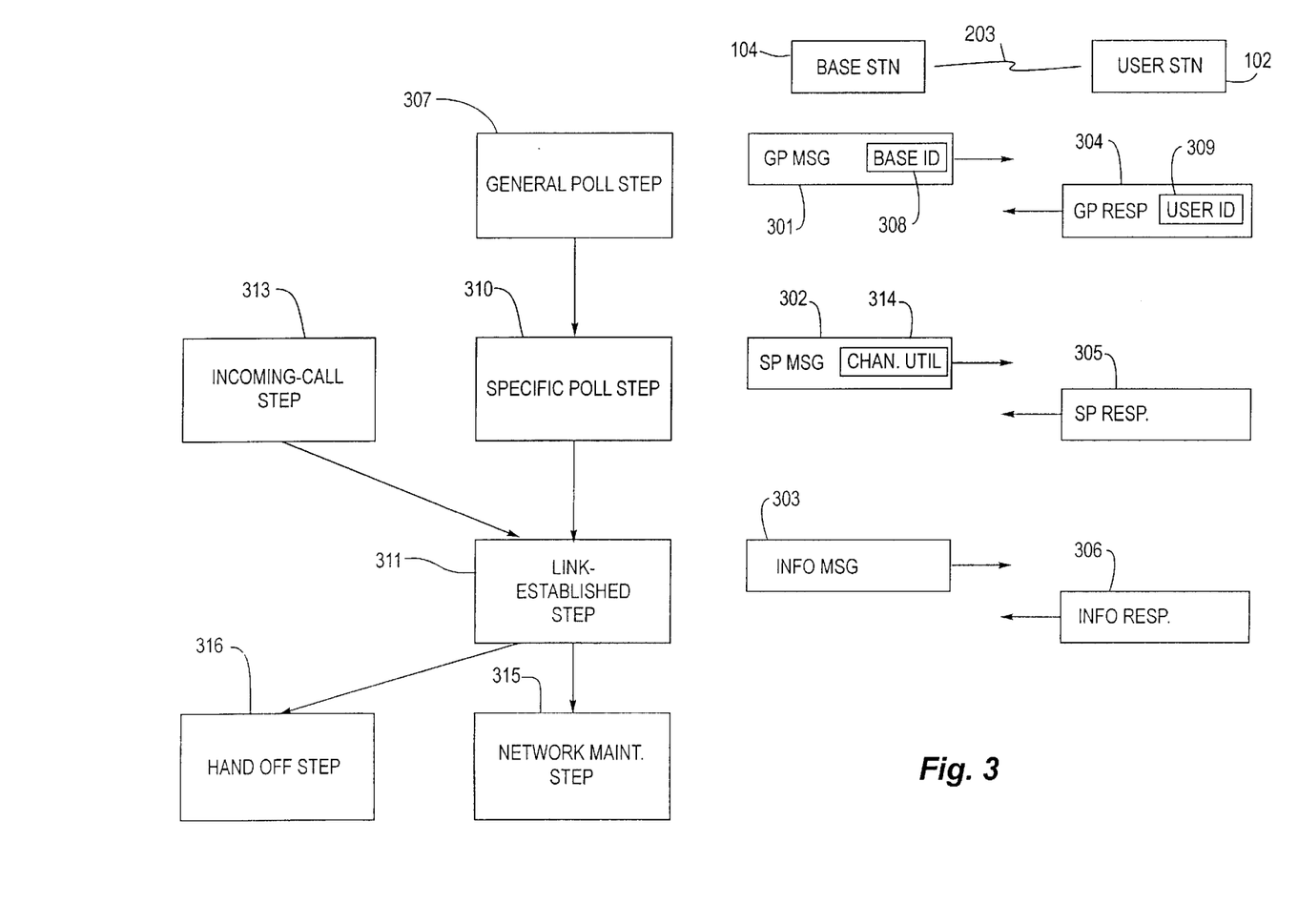
FIG. 3 is a diagram showing formats for message types.

During link expansion, described with regard to FIG. 3 herein, the D field 208 may also comprise a user nickname 212 for communication from the base station 104 and a designated user station 102. The user nickname 212 may comprise a temporary identifier for the user station 102 selected by the base station 104.

The B field 209 may comprise data, voice (encoded digitally or otherwise), or other information. In a preferred embodiment, the B field 209 may also comprise specified information for establishing communication links between base stations 104 and user stations 102. The B field 209 may also comprise its own FCW or CRC code 211 having sixteen bits (with 160 bits of information, a total of 176 bits).

In a preferred embodiment, there may be 32 air channels 203; the major frame 201 may therefore comprise 32 minor frames 202 in sequence. Thus, each minor frame 202 may be about 307 microseconds long, each air channel 203 (in a TDD or TDMA system) may be about 667 microseconds long, and each major frame 201 may be about 20 milliseconds long. In a preferred embodiment, there may be 160 bits transmitted per air channel 203; thus the 32-channel system would have about a 256 kilobits/second total two-way data rate. Other time values are shown in the figure.

In a preferred embodiment, information may be transmitted at a rate of five bits each 6.4 microseconds, using a 32-ary code-shift keying technique. Thus, each 6.4 microseconds, one of 32 different codes may be transmitted, with 32 different possibilities equalling five bits of information. In an alternative preferred embodiment, one of 16 different codes may be transmitted, with an additional phase bit on the carrier (or, in a second alternative, more than one phase bit on the carrier), again with 32 different possibilities equalling five bits of information.

In one embodiment, a minor frame 203 may operate in an asymmetric mode in the sense that the greater portion of a minor frame 202 is devoted to either the base transmission 204 or the user transmission 206. High speed data transport in either direction (i.e., from the base station 104 to the user station 102, or vice versa) can be provided in the asymmetric mode, with or without acknowledgment and/or ARQ.

A particular sub-mode of the above described asymmetric mode may be referred to as broadcast mode in which essentially the entire minor frame is devoted to one-way communication. In the broadcast mode, one or more broadcast sub-channels may be identified by a special broadcast identifier. Up to 255 broadcast channels may be so identified. For these point-to-multipoint applications, broadcast frames are not acknowledged.

Control Pulse

A user station 102 in a cellular environment preferably has means for controlling transmission power to avoid interference with adjacent cells. Unlike a fixed station environment, in which antenna locations, patterns and fixed station transmission power may be adjusted for minimal interference with other fixed stations, the nature of a cellular environment with mobile user stations 102 is such that there can arise conflict between user stations 102 at intersecting cell boundaries. This creates the need for some power control in the user stations 102. For example, a user station 102 operating at the boundary of coverage of a base station 104 may need to transmit at full power to stay in contact. On the other hand, a user station 102 operating relatively close to its own base station 104 may not need to transmit full power to have good contact. By proper power control, user stations 102 may maintain adequate contact with base stations 104 without unduly interfering with neighboring cell transmissions, allowing RF channel reuse in nearby cells. Power control may also reduce interference with fixed microwave users and conserve battery power in user stations 102 such as handheld units.

The present invention achieves power control in one embodiment by use of a power control pulse transmitted periodically from each user station 102. After establishment of a communication link, described with regard to FIG. 3 herein, a control pulse time 213 and a third gap 214 may be reserved just prior to the start of the minor frame 202, in which the user station 102 transmits a control pulse 215. The control pulse 215 provides to the base station 104 a power measurement of the air channel 203 indicative of the path transmission loss and link quality. Each user station 102 generally transmits its control pulse 215 in the minor frame 202 allocated to it (e.g., seized by the user station 102).

The control pulse 215 may be received by the base station 104 and used by the base station 104 to determine information about the communication link it has with the user station 102. For example, the base station 104 may determine, in response to the power, envelope, or phase of the control pulse 215, the direction or distance of the user station 104, and the degree of noise or multipath error to which the communication link with the user station 102 may be prone.

In response to receiving the control pulse 215, the base station 104 determines the quality of the received signal including, for example, the received power from the power control pulse 215 and the signal-to-noise or interference ratio. The base station 104 then sends a message to inform the user station 102 to adjust its power if needed. Based on the quality of the received signal, the base station 104 may command the user station 102 to change (increase or decrease) its transmit power by some discrete amount (e.g, in minimum steps of 3 dB) relative to its current setting, until the quality of the control pulse 215 received by the base station 104 is above an acceptable threshold.

Similarly, if the base station 104 knows the power setting of the user station 102, then the base station 104 can adjust its own power as well. The base station 104 may adjust its power separately for each minor frame 202.

A preferred power control command pulse from the base station 104 to the user station 102 may be encoded according to Table 5-1 below:

TABLE 5-1

| Power Control Command | Adjustment |
|---|---|
| 000 | No change |
| 001 | −3 dB |
| 010 | −6 dB |
| 011 | −9 dB |

TABLE 5-1-continued

| Power Control Command | Adjustment |
|---|---|
| 100 | +3 dB |
| 101 | +6 dB |
| 110 | +12 dB |
| 111 | +21 dB |

Although preferred values are provided in Table 5-1, the number of power control command steps and the differential in power adjustment between steps may vary depending upon the particular application and the system specifications.

While power control is thus desirable, a problem in some conventional TDMA systems is that the length of the polling loop (e.g, the major frame 201) is too long to allow the latest user transmission to be very useful for estimating the channel losses and impairments. In other words, the latency of the polling loop signals may prevent the use of closed loop power control. However, the described embodiment allows for a power control sequence that may be effectively carried out in a relatively short span of time, thereby allowing closed loop power control. Preferably, the elapsed time encompassing transmission of the control pulse 215, the base transmission 204, and the start of the user transmission 206 is kept relatively short (e.g., less than 500 μsec or roughly 2.5% of the duration of the major frame 201), allowing system response to be fast enough to counteract small scale multipath fading effects and propagation shadow effects.

The base station 104 may also use the control pulse 215 to measure the time delay from a user station 102 and thereby estimate the distance of the user station 102 from the base station 104. For 911 support, a user station 102 can provide control pulses 215 to multiple base stations 104 for rough location estimation in emergency situations.

In a preferred embodiment, the base station 104 may have a plurality of antennas for reception and transmission on the communication link with the user station 102, and may select one of that plurality of antennas for reception and/or transmission, in response to the determination the base station 104 may make in response to the control pulse 215. The base station 104 may make the determination of which antenna to use based on the quality of the signal received from the control pulse 215 transmitted by the user station 102. Because the base station can both receive and transmit on the antenna having the best received signal quality from the control pulse 215, the user stations 102 benefit from antenna selection diversity even though they might not have explicit antenna diversity capabilities at the user station 102. The control pulse 215 permits spatial diversity control to be updated during each minor frame 202. Preferably, the base station 104 employs a high speed TDD technique such that the RF channel characteristics do not change within the time of the minor frame 202.

Information relating to the control pulse 215 for a particular user station 102 may be transferred as information in control traffic from one base station 104 to another base station 104 in the case of a base station assisted handoff.

It should be noted that, in the preferred TDMA system described herein, the requirement of strict RF transmitter output power control is not necessary to resolve the "near-far" problem commonly experienced in CDMA systems. The purpose of the control pulse 215 is primarily to reduce battery consumption in user stations 102, to minimize interference of transmissions among neighboring cells 103 which may be operating on the same or adjacent RF channels, and to minimize interference with nearby fixed microwave users.

The control pulse 215 may also serve as a synchronization preamble for determining the beginning of M-ary data symbols within the minor frame 202. A power control command pulse, similar in length to the control pulse 215, transmitted by the base station 104 during the base transmission 204 or otherwise may likewise be used as a synchronization preamble at the user station 102, in addition to providing a power control command to adjust the power output level at the user station 102.

Base Station Output Power

Because a single base station 104 may communicate with a large number of user stations 102 (e.g., as many as 64 user stations 102) at a given time, each of whose distance from the base station 104 may vary from near zero up to the radius of the cell 103, it may not be practical to control the transmitter power of the base station 104 in order to maintain a near-constant received power level at each user station 102 during each minor frame 202. Output power control of the transmitter at the base station 104 could require a large change (e.g., more than 40 dB) in transmit power during each minor frame 202 (e.g., every 625 $\mu$s) of the major frame 201. As an alternative to providing power control on a minor frame 202 by minor frame 202 basis, output power control at the base station 104 can be averaged over a longer time interval than each minor frame 202.

Antenna Characteristics

In one aspect of the invention, the reciprocal nature of time division duplex (TDD) permits common antennas to be used for transmit and receive functions at both the base station 104 and the user stations 102, without the need for antenna diplexers. Common antennas can be used to transmit and receive because these functions are separated in time at each of the terminals. Further, because TDD utilizes the same RF frequency for the transmit and receive functions, the channel characteristics are essentially the same for both the base station 104 and a particular user station 102.

The use of common antennas results in simplicity of the base station 104 and user station 102 terminal designs. Further, use of the same RF frequency and antenna for both transmit and receive functions at the base station 104 and the user station 102 provides reciprocal propagation paths between the base station 104 and user station 102 terminals. This reciprocal nature allows the base station 104 to use the channel sounding of the control pulse 215 transmitted by the user station 102 to determine the two-way path loss between the base station 104 and the user station 102, and also to determine which of the spatial diversity antennas at the base station 104 to use, both to receive from the user station 102 and to transmit to the user station 102.

Different types of antennas may be used by the base station 104, depending on the type of application. For low density suburban or rural applications an omnidirectional antenna may be used to provide maximum coverage with the fewest base stations 104. For example, an omnidirectional antenna may be employed having a vertical gain of approximately 9 dB. The 9 dB of gain permits a relatively large radius cell even with an omnidirectional horizontal pattern.

In suburban and low density urban areas, directional antennas with 120 degree azimuth beam widths and 9 dB vertical gain may be used at the base station 104 so that a cell 103 can be sectorized into three parts, with each sector accommodating a full load of user stations 102 (e.g., 32 full duplex user stations 102).

The use of TDD also permits utilization of a single steered phased array antenna at the base station 104 for applications requiring a high gain, highly directional antenna. Similar deployment in CDMA or FDMA systems would, in contrast, be more complex and costly, as they may require simultaneous steered beams for each user station 102 within the cell 103.

For example, to permit a single base station 104 to cover large, sparsely populated area, a steered array antenna with up to 20 dB of horizontal directivity can be used. Such an antenna is sequentially steered to each user station 102 within a cell 103 at each minor frame 202. The same antenna may be used for both transmission and reception, as noted, providing reciprocal forward and reverse link propagation characteristics. The steered array antenna may utilize circular polarization so that high level delayed clutter signals reflected from buildings or other obstructions within the beam path do not interfere with the received signals from the user stations 102. As reflected signals are typically reversed in polarization, they will be rejected by the circularly polarized antenna. It should be noted that such high gain, directional antennas also reduce the delay spread in severe multipath environments by rejecting multipath components arriving from outside the main beam of the antenna.

In one embodiment, the user station 102 employs a halfwave dipole antenna which is linearly polarized and provides a gain of 2 dB with an omnidirectional pattern perpendicular to the antenna axis. At a nominal frequency of 1900 MHz, a half wavelength is approximately 3 inches, which fits well within a handset envelope.

MESSAGE TYPES AND PROTOCOL

FIG. 3 shows message types and a protocol which uses those message types.

In a preferred embodiment, messages (base transmissions 204 and user transmissions 206) may be one of three types: a general poll message 301, a specific poll message 302, and an information message 303. When a message is transmitted by a user station 102, it is called a "response", e.g., a general poll response 304, a specific poll response 305, and an information response 306.

User Station Initiation of a Link

A user station 102 may "acquire" a base station 104 by a sequence of handshaking steps. At a general poll step 307, the base station 104 may transmit its general poll message 301 on an air channel 203 as part of a minor frame 202. The user station 102 receives the general poll message 301 and, if and only if it was received without error, transmits its general poll response 304 on the same air channel 203. The general poll message 301 comprises a base ID 308, which may be 32 bits long, which may be recorded by the user station 102. In like manner, the general poll response 304 comprises a user ID 309, which may be 32 bits long, which may be recorded by the base station 104. The base ID 308 may be used during handoff, as noted herein.

Upon receiving a general poll response 304, at a specific poll step 310, the base station 104 may transmit a specific poll message 302, comprising the user ID 309 received by the base station 104 as part of the general poll response 304. The specific poll message 302 may be transmitted on the same air channel 203 as the general poll message 301, or may be transmitted on another air channel 203, so long as the user station 102 is able to find it.

The user station 102 may monitor all air channels 203 for its specific user ID 309. The user station 102 receives the specific poll message 302 and, if and only if it was received without error and with the same user ID 309, transmits its specific poll response 305 on the same air channel 203. The specific poll response 305 comprises the same user ID 309 as the general poll response 304.

In a preferred embodiment, however, the specific poll message 302 may be eliminated as redundant. The user station 102 may therefore follow the general poll response 304 with a specific poll response 305 on a selected air channel 203. This air channel 203 may be designated by the base station 104 in a part of the information field 209 of the general poll message 301, it may be designated by the user station 102 in a part of the information field 209 of the general poll response 304, or it may be selected by the user station 102 in response to an unoccupied air channel 203 (e.g., the user station 102 may seize an unoccupied air channel 203). The latter of these three alternatives is presently preferred by the inventors.

Upon receiving a specific poll response 305 comprising a user ID 309 which matches that of the general poll response 304, at a link-established step 311, the base station 104 may transmit an information message 303. At this point, the base station 104 and user station 102 have established a communication link 312 on a designated air channel 203, typically the air channel 203 originally polled by the base station 104, but possibly a different air channel 203. The base station 104 may couple a telephone line to that air channel 203, and the user station 102 may begin normal operation on a telephone network (e.g., the user station 102 may receive a dial tone, dial a number, make a telephone connection, and perform other telephone operations). The base station 104 and user station 102 may exchange information messages 303 and information responses 306, until the communication link 312 is voluntarily terminated, until faulty communication prompts the user station 102 to re-acquire the base station 104, or until handoff of the user station 102 to another base station 104.

Should more than one user station 102 respond to a general poll message 301 in the same minor frame 202, the base station 104 may advertently fail to respond. The lack of response from the base station 104 signals the involved user stations 102 to back off for a calculated time interval before attempting to acquire the same base station 104 using the general poll message 301 and general poll response 304 protocol. The back-off time may be based upon the user ID 309, and therefore each user station 102 will back off for a different length of time to prevent future collisions.

In one embodiment, the general poll message is sent by a base station 104 on one or more currently unoccupied air channels 203. Originally, at power-up of the base station 104, the base transmission 204 for all of the air channels 203 may therefore contain the general poll message 301.

Base Station Initiation of a Link

When an incoming telephone call is received at a base station 104, at an incoming-call step 313, the base station 104 transmits a specific poll message 302 with the user ID 309 of the indicated recipient user station 102 (skipping the general poll message 301 and the general poll response 304) on an available air channel 203.

Each user station 102 listens for the specific poll message 302 repeatedly on each air channel 203 so as to receive the specific poll message 302 within a predetermined time after it is transmitted. Thus each user station 102 may periodically receive each air channel 203 in sequence so as to listen for the specific poll message 302.

When the specific poll message 302 is received, the user station 102 compares the user ID 309 in the message with its own user ID, and if they match, continues with the link-established step 311. The base station 104 may thus establish a communication link 312 with any user station 102 within communication range.

Link Expansion and Reduction

The data transmission rate between a base station 104 and a user station 102 may be expanded or contracted over the duration of the communication link.

In one embodiment, the base station 104 increases the data transmission rate by transmitting multiple information messages 303 to the user station 102 during a major frame 201, essentially allocating multiple minor frames 202 to a single user station 102. These higher data rates, also known as "super rates", are implemented by means of a targeted information message 303. In a targeted information message 303, the base station 104 may transmit the user nickname 212 in the D field 208, along with information to be transmitted to the designated user station 102 in the B field 209. When the user station 102 detects the user nickname 212 assigned to it, it receives the targeted information message 303.

In a preferred embodiment, the user nickname 212 may be transmitted by the base station 104 to the user station 102 in the specific poll message 302. In an embodiment where the specific poll message 302 has been eliminated as redundant, the user nickname 212 may be transmitted by the base station 104 to the user station 102 bit-serially in a designated bit of the header field 207.

Because the data transmission rate is related to the number of minor frames 202 allocated to a specific user station 102, the data transmission rate increases in steps of, for example, 8 Kbps. It is contemplated that up to the full bandwidth of the base station 104—that is, up to all 32 full duplex slots or 256 Kbps (full duplex)—may be assigned to a single user station 102.

The invention also provides in another aspect data rates lower than the basic rate (i.e., less than one minor frame 202 per major frame 201 or less than 8 Kbps). The lower data rate is accomplished by skipping major frames 201 on a periodic basis. Thus, data rates such as 4 Kbps, 2 Kbps, and so on can be provided. In one embodiment, up to 24 consecutive major frames 201 may be skipped, providing a minimum data rate of 320 bps efficiently (i.e., without using rate adaptation). Intermediate rates or even lower rates may be obtained by using rate adaptation.

The capability of providing variable data rates on demand, including availability of an asymmetric mode in a given minor frame 202 described earlier, provides an efficient and flexible data conduit for a wide array of data, video, multi-media and broadcast applications. For example, each minor frame 202 can be configured with the majority of the minor frame 202 duration allocated to either the base transmission 204 or the user transmission 206, or can be configured with a symmetric distribution in which half of the minor frame 202 duration is allocated to both the base transmission 204 and the user transmission 206. Typically, voice traffic utilizes a symmetric distribution as either end of the link may send voice traffic. In a data exchange, however, more data is typically sent in one direction and less in the other. For instance, if fax data is being sent to a user station 102, then a higher data rate for the base transmission 204 would be advantageous and is supportable with the described configuration. For even higher data rate applications, a particular base station 104 or user station 102 may be assigned multiple minor frames 202 within a single major frame 201. These high data rate modes can support, for example, enhanced voice quality, video data or broadcast data applications.

Handoff and Network Maintenance

Once a base station 104 and user station 102 have established a communication link 312, during the link-established step 311 the user station 102 may receive all information messages 303 and transmit all information responses 306 on the same air channel 203 or on specified multiple air channels 203. This arrangement leaves the remainder of the major frame 201 free for other activities. In a preferred embodiment, one such activity is to interrogate other base stations 104 and maintain network information such as link quality and channel availability at nearby base stations 104 in order to facilitate handoffs from one base station 104 to another base station 104.

In a preferred embodiment, base stations 104 transmit network information as part of the general poll message 301 and the specific poll message 302, in a channel utilization field 314 or otherwise. The network information may include, for example, the identity of nearby base stations, the identity or relative amount of free channels at a particular nearby base stations and/or at the current base station, link quality for nearby base stations and/or the current base station, and frequencies and spread spectrum code sets used by the nearby base stations.

At a network-maintenance step 315, the user station 102 may listen on one or more different air channels 203, other than the one(s) currently being used by the user station 102, for the general poll message 301 and the specific poll message 302 from nearby base stations 104. The user station 102 continues to communicate on its designated air channel (s) 203 with its current base station 104 and responds as necessary to information messages 303 from that base station 104. However, unless a handoff procedure is initiated as described below, the user station 102 does not transmit in response to other nearby base stations 104 and therefore does not occupy air channels 203 of those base stations 104.

It is contemplated that the system may perform either a "make before break" handoff for seamless, undetectable handoffs, or a "break before make" handoff in emergency situations where all communications with a base station 104 are lost prior to a new connection being established.

In a "make before break" handoff, if the communication link 312 between the base station 104 and the user station 102 is too faulty, then the user station 102 may acquire one of the nearby base stations 104 in like manner as it acquired its current base station 104. Such a handoff procedure may be further explained with reference to FIG. 4.

Figure 4:
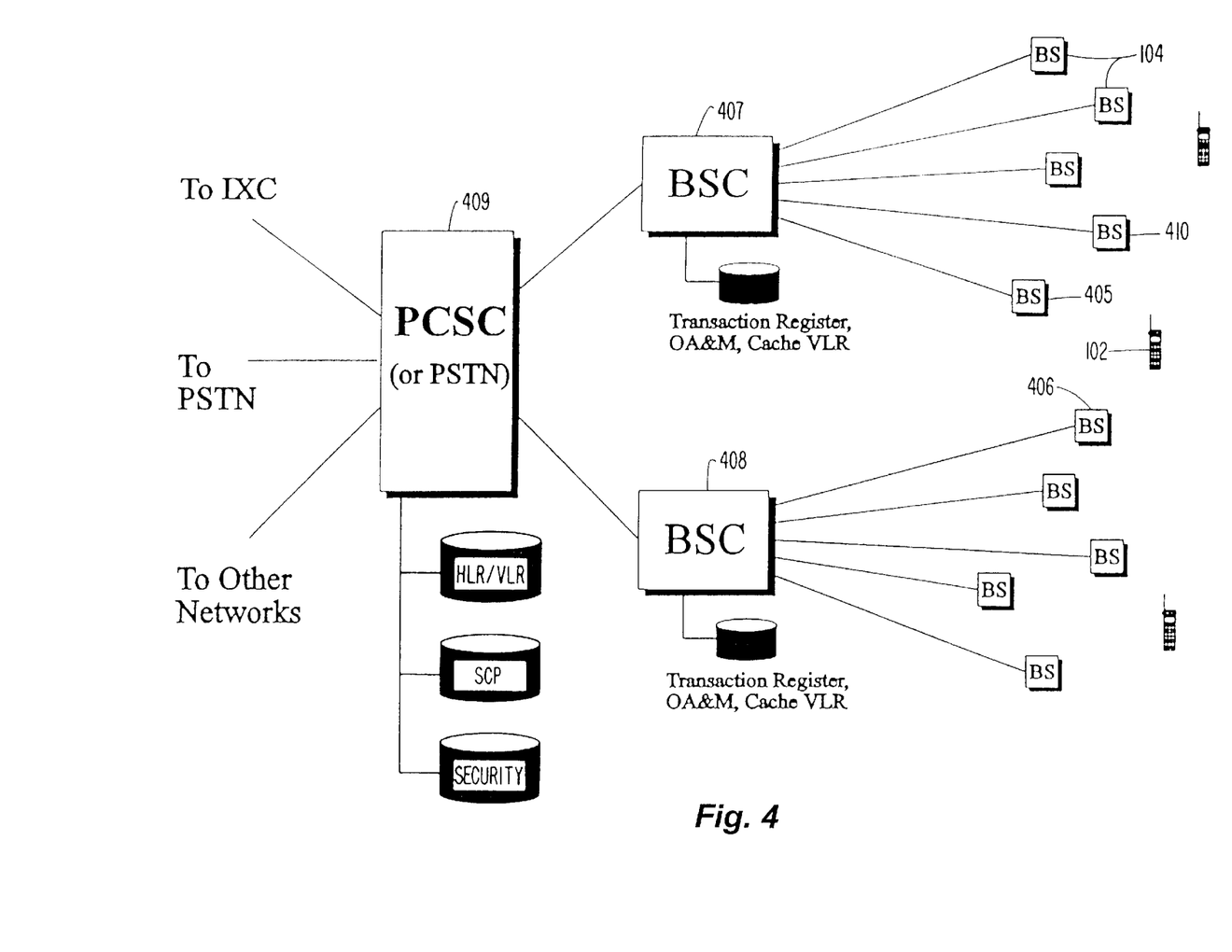
FIG. 4 is a diagram of a network architecture showing connections between base stations and a network.

In FIG. 4, it is assumed that a user station 102 presently in communication with a current or original base station 405 has determined it to be desirable to transfer communication to a different base station 104, such as a first terminal base station 410 coupled to a common base station controller 407, or a second terminal base station 406 coupled to a different base station controller 408. A handoff to the first terminal base station 410 will be termed an "intra-cluster" handoff, while a handoff to the second terminal base station 406 will be termed an "inter-cluster" handoff. The following explanation will focus on an intra-cluster handoff to the first terminal base station 410, but many of the steps are the same as with an inter-cluster handoff, and the salient differences between an intra-cluster and inter-cluster handoff will be noted as necessary.

In general, when the user station 102 determines that a handoff is appropriate, the user station 102 acquires an air channel on the new or terminal base station 410 and notifies the base station controller 407 coupled to the current base station 405 to switch the incoming phone line from the current base station 405 to the new base station 410.

More specifically, a handoff procedure may be initiated when the received signal level at a user station 102 falls below an acceptable level. While the user station 102 receives bearer traffic from its originating base station 405, the user station 102 measures the received signal quality (e.g., RSSI) of its communication link 312. The received signal quality value, together with measurements of the current frame error rate and type of errors, determines the overall link quality. If the overall link quality drops below a first threshold (the measurement threshold), the user station 102 begins searching for available air channels 203 (i.e., time slots), first from the originating base station 104, and then (using appropriate frequencies and spread spectrum codes) from neighboring base stations 104 of adjacent or nearby cells 103. The user station 102, as mentioned, preferably has obtained information regarding the identities of neighboring base stations 104 (including spread spectrum code set and frequency information) from the originating base station 405 by downloading the information to the user station 102 during traffic mode or otherwise.

As the user station 102 scans potential new air channels 203 using the appropriate frequency and/or spread spectrum code set, the user station 102 measures and records the received signal quality. The user station 102 reads a field carried in all base transmissions 204 which describes the current time slot utilization of the base station 104. The user station 102 uses these two pieces of information to form a figure of merit for the new base station signals, including the originating base station 405, and then sorts the base stations 104 by figure of merit. This procedure allows the user station 102 to evaluate the quality of available air channels 203 for both the originating base station 405 and other nearby base stations 104.

If an air channel 203 (or air channels 203, as the case may be) for the originating base station 405 has better quality than that of any base station 104 in adjacent or nearby cells 103, a time slot interchange (TSI) handoff is considered, which maintains the link to the originating base station 405 on a different air channel 203 than was previously being used by the user station 102.

If the link quality drops below a second threshold level, then the user station 102 (during a no-bearer time slot) requests a handoff from the base station 104 with the highest figure of merit (which could be a TSI handoff with the originating base station 405). The handoff is requested by seizing an air channel 203, sending a handoff message request, and waiting for an acknowledgment from the new base station 410. The handoff signaling message contains a description of the circuit connecting the originating base station 405 to the network, which description was passed to the user station 102 at call establishment time. If the new base station 104 accepts the handoff request (by acknowledging), then the new base station 104 becomes the terminal base station 410. Note that the user station 102 maintains its original air channel 203 connection with the originating base station 405 during this handoff procedure, at least until a new air channel 203 is acquired.

To complete an intra-cluster handoff, at a handoff step 316 the user station 102 transmits to the new base station 410 the base ID 308 of the old base station 405. The old base station 405 and new base station 410 may then transfer the handling of any telephone call in progress.

More specifically, the terminal base station 410 sends a message in the form of a "note" (as previously described) to its base station controller 407, requesting that the original circuit be switched from the originating base station 405 to the terminal base station 410. If the base station controller 407 is common to both the originating base station 405 and terminal base station 410, the handoff is termed an intra-cluster event, and the base station controller 407 bridges the circuit from the originating base station 405 to the terminal base station 410. The base station controller 407 then sends a circuit-switch-complete note to the originating base station 405 and also to the terminating base station 410, commanding the latter to continue the handoff process.

In the case of an inter-cluster handoff, the base station controller 408 is not common to both the originating base stations 104 and the terminal base station 406. For these types of handoffs, as with intra-cluster handoffs, the terminal base station 406 sends a message in the form of a note to its base station controller 408, requesting that the original circuit be switched from the originating base station 405 to the terminal base station 406. The base station controller 408 translates the handoff note into the signaling language of the network host 409 (e.g., a PCSC) and requests an inter-cluster handoff at the network level.

In some network architectures, the host network 409 cannot accept a handoff request from a terminating base station controller 408, in which case an intermediate step is taken. The handoff request may be sent via an X.25 link to the base station controller 407 connected to the originating base station 405. The originating base station controller 407 then translates the handoff request and relays it to the network host 409. The network host 409 acknowledges the circuit switch to the originating base station controller 407, which then sends a circuit-switch-complete note to the terminal base station 406.

When the terminal base station 406 receives the circuit-switch-complete note, the terminal base station 406 begins paging the user station 102 with a specific poll, and the originating base station 405 signals the user station 102 to transfer to the terminal base station 406. When the user station 102 receives the signal to transfer to the terminal base station 406, or if the link is lost during the handoff process, the user station 102 switches to the terminal base station 406 and searches for a specific poll message 302. When the user station 102 receives the specific poll message 302, the user station 102 completes the connection to the terminal base station 406, and the handoff procedure is finished.

Should the link between the user station 102 and the originating base station 405 or terminating base station 406 (or 410) be completely broken at any time, the user station 102 will search for the highest quality base station 104 on its list of potential handoffs, and attempt a handoff without communication with its previous base station 405. This capability allows the user station 102 to recover from situations in which the original link was broken before the normal handoff procedure could be completed.

An intra-cluster handoff, including re-establishment of bearer channel traffic, may ordinarily take from less than 10 milliseconds to as much as 40 milliseconds. Since under normal circumstances the handoff time is less than one polling loop interval, bearer packets will continue to the user station 102 with no interruption. Inter-cluster handoff times are partially dependent upon the delays inherent in the host network 409 and are not always easily predictable.

A unique aspect of the above described "mobile directed" or "mobile centric" handoff technique is that the user station 102 makes the decision to handoff between cells and directs the base station controller or network to make a line switch once an alternative base station 104 is acquired. This approach is quite different from a "network directed" or "network centric" approach such as used in systems such as AMPS, IS-54 cellular, and GSM. The mobile centric approach also differs significantly from so-called "Mobile Assisted Handoff" (MAHO) in which the network collects information and directs all or most of the handoff functions, thereby utilizing the user station 102 primarily as an additional listening post with the network still directing the handoff. The MAHO technique therefore ordinarily requires significant signaling and messaging between base stations, base station controllers, and switches, causing handoffs to take much longer than with the mobile centric techniques described herein.

A major benefit of the mobile centric approach is that it may allow for mobile speed handoffs (e.g., 65 MPH) even in very small or very large cells, such as cells ranging from as small as under 1000 feet to as large as 20 miles in diameter.

The system is also capable of performing a "break before make" type of handoff as well. A "break before make" handoff is typified in a situation where sudden shadowing occurs, such as when a connection with the current base station 405 is lost due to a severe signal blockage (e.g. worse than 40 dB) near the limit of the cell range such as can occur when turning a corner quickly in a dense urban high rise area. In such a situation, the user station 102 checks its previously created "priority list" of available base stations in the vicinity and attempts to establish contact with a new base station 104, perhaps on a new frequency and/or a new time slot. The user station 102 may include as part of its control logic a "persistence" parameter which will preclude call tear down from occurring before a duplex connection is fully reestablished.

The true "hard handoff" problem (i.e., a lost air channel) may in many instances be handled very quickly through the ability of the user station 102 to re-acquire the original base station 405 or to acquire a different base station 104 very rapidly even when no information is available to the user station 102 when the link was lost. Even in such an emergency "break before make" handoff situation, the handoff may ordinarily be accomplished in as little as 16 to 250 milliseconds. In contrast, complete loss of a link in traditional cellular architectures becomes a "dropped call."

One problem that may occur during handoff is a situation in which there are repeated attempts to switch between two or more base stations 104 during times, for example, when the measured quality of the received signals from two competing base stations 104 is very close, or when environmental effects cause rapidly changing deviations in the relative measured signal quality of the signals from competing base stations 104. The repeated switching between competing base stations 104 may be referred to as "thrashing" and may have the undesirable effect of consuming excess capacity from the network. In order to reduce the effect of thrashing, hysteresis measurements from multiple base stations 104 may be maintained by the user station 102 so that a handoff does not occur until the quality of the signal from a new base station 104 exceeds the quality of the signal of the original base station 405 by a predetermined margin. In such a manner, important air channel resources in the network may be preserved.

In rare instances, two user stations 102 on the same minor frame 202 in different cells 103 but on the same frequency may encounter propagation characteristics in which the spatial and code separation are insufficient to prevent bit errors, thus causing the user stations 102 to begin experiencing degradation of their RF links. In such cases, a time slot interchange (TSI) may be performed wherein one or both of the conflicting user stations 102 are assigned different minor frames 202 within their respective major frames 201 to eliminate further collisions. Such a procedure may be viewed as the time domain equivalent of dynamic channel allocation as the system either assigns an unoccupied air channel 203 to the user station 102 or switches the user station's 102 minor frame 202 with that of another user station 102 in the same cell 103 which is geographically removed from the interference.

Security and Error Handling

The protocol of the invention protects communications against errors in several ways: protocol handshaking, user ID verification and reverification, and synchronization by reacquiring the base station. Handshaking, verification and synchronization protect both the base station 104 and the user station 102 from receiving telephone calls in progress on any other air channels 203.

Handshaking provided by the general poll step 307 and the specific poll step 310 requires that the proper message having the proper header be transmitted and received, and in the proper sequence. In each message, the header field 207 (sixteen bits) is protected by a CRC code 211 (four bits); an error in the header field 207 or in the CRC code 211 indicates an error and will cause the protocol to restart handshaking with the general poll step 307.

The user ID is verified twice, once by the base station 104 and once by the user station 102. In the general poll message 301 and specific poll message 302, the user ID 309 is protected by a CRC code 211 (sixteen bits), in like manner as the CRC code 211 for the header field 207. An error in the user ID 309 or in the CRC code 211 will cause the protocol to restart handshaking with the general poll step 307.

At the link-established step 311, the base station 104 and the user station 102 are protected against drift and/or desynchronization, even when transmission or reception are interrupted. When a threshold for an error rate is exceeded, the base station 104 and user station 102 each independently stop sending data in information messages 303 and information responses 306, and return to the specific poll step 310 for resynchronization. In an embodiment where the specific poll message has been eliminated as redundant, the base station 104 and the user station 102 may determine resynchronization by means of a designated bit in the header field 207.

At the specific poll step 310, the base station 104 transmits the specific poll message 302 and the user station 102 searches the major frame 201 for a specific poll message 302 having a user ID 309 which matches its own user ID 309. After this handshaking succeeds, the base station 104 and user station 102 return to the link-established step 311 and continue transmitting and receiving information messages 303 and information responses 306.

This technique for recovery from desynchronization, also called "reacquiring the base station," has the advantage that both the base station 104 and the user station 102 independently reverify the user ID 309 before communication is resumed. This assures that the base station 104 and the user station 102 stay in synchrony and communicate only on the agreed air channel 203. Should the base station 104 and the user station 102 be unable to reestablish the communication link 312, the telephone call will be terminated by the base station 104.

At the link-established step 311, the base station 104 also repeatedly and periodically transmits the user ID 309 in the D field 208 of the information message 303. The user station 102 checks the user ID 309 to assure that the base station 104 and the user station 102 are each communicating on the proper air channel 203. If this user ID 309 does not match, it returns to the specific poll step 310 to re acquire the base station 104, as noted above.

Protocol Flexibility

The protocol described above provides flexibility with a small number of unique messages. The protocol is immune to changes in polling loop length and in the number of air channels allowed. The number of simultaneous users is therefore responsive to voice compression and data rate constraints and not by the protocol. The protocol also provides for an unlimited number of user stations in a given area, with the provision that the number of simultaneous calls cannot exceed the number of air channels. An unlimited number of base stations are also supported, making base station geography a function of available frequencies and range, not of protocol. The ability to interrogate and acquire alternate base stations in the presence of faulty communication provides for the expansion of a micro cell network which may use base station handoff to route calls to base stations within range.

System Synchronization

In order to maximize system throughput capacity, the TDMA frame times for all base stations 104 within a geographical region are preferably synchronized to within a specified tolerance. For example, in one embodiment, all base stations 104 begin transmissions for the same frame within 6 microseconds.

The primary data timing standard in a digital network backhaul system, such as T1, ISDN BRI, or PRI, is the public switched telephone network (PSTN) timing standard. To prevent data precession into over run or under run, all base station controllers 105 and base stations 104 in such systems are synchronized to the PSTN timing standard.

At the system level, a GPS receiver is used at each base station controller 105 (and optionally at each base station 104) to generate the primary reference timing marker for the TDMA frame timing. This marker is captured at the base station controller 105 every second and transmitted to the attached base stations 104. A base station controller may temporarily turn off any major frame 201 or minor frame 202 of a given cell 103 which may be interfering with a neighboring cell 103.

Each base station 104 provides the basic TDMA loop timing structure for its cell or sector. As previously noted, a synchronization preamble in the form a control pulse 215 or power control command is transmitted at the beginning of each minor frame 202 by the user station 102 and the base station 104, respectively. When the appropriate preamble, consisting of a code sequence 48 chips in length, is received, a digital correlator (i.e., a matched filter) attuned to the specific preamble generates an internal synchronization pulse which may be very brief (e.g., two chips in duration, or 400 nanoseconds). The internal synchronization pulse may then be used to synchronize the start of M-ary symbol detection process.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, information which is transmitted from transmitter to receiver is referred to herein as "data", but it would be clear to those of ordinary skill in the art, after perusal of this application, that these data could comprise data, voice (encoded digitally or otherwise) error-correcting codes, control information, or other signals, and that this would be within the scope and spirit of the invention.

Moreover, while the specification has been described with reference to TDMA multiplexing of air channels, it would be clear to those of ordinary skill in the art, after perusal of this application, that air channels may be multiplexed by other means, including FDMA (frequency division multiplexing), by assigning air channels to differing frequency bands, CDMA (code division multiplexing), by assigning air channels to differing spread-spectrum spreading codes, other multiplexing techniques, or combinations of these multiplexing techniques, and that this would be within the scope and spirit of the invention.

What is claimed is:

1. A time division multiple access communication system supporting different data rates, comprising:

a time division multiple access protocol according to which each of a plurality of major time frames is divided into a plurality of minor time frames, each of said plurality of minor time frames being freely allocable and of uniform duration, and each minor time frame having a forward link transmission interval and a reverse link transmission interval for supporting time division duplex communication, a base station, and a plurality of user stations capable of communicating with said base station using said time division multiple access protocol, wherein a number of minor time frames is assigned to each user station in communication with said base station according to a bandwidth demand, said minor time frames being assigned without regard to their relative positions within a major time frame.

2. The time division multiple access communication system of claim 1 wherein said base station and said user stations communicate using direct sequence spread spectrum communication.

3. The time division multiple access communication system of claim 1, wherein each minor time frame is either symmetric or asymmetric, and wherein the forward link transmission interval of a symmetric minor time frame is equal in time allocation to its reverse link transmission interval, and the forward link transmission interval of an asymmetric minor time frame is unequal in time allocation to its reverse link transmission interval.

4. A time division multiple access communication system comprising:

a time division multiple access protocol according to which each of a plurality of major time frames is divided into a plurality of minor time frames, each of said plurality of minor time frames being freely allocable and of uniform duration, and each minor time frame having a forward link transmission interval and a reverse link transmission interval, a base station, and a plurality of user stations capable of communicating with said base station in assigned minor time frames, each user station operating in one of a plurality of user station modes, wherein a first one of said plurality of user station modes is characterized by communication with said base station in a plurality of minor time frames in each major time frame, said minor time frames being made available for communication in said first user station mode without regard to their relative positions within the major time frame, a second one of said plurality of user station modes is characterized by communication with said base station in a single minor time frame in each major time frame, and a third one of said plurality of user station modes is characterized by communication with said base station in fewer than one minor time frame in each major time frame.

5. The time division multiple access communication system of claim 4 wherein said base station and said user stations communicate using direct sequence spread spectrum communication.

6. The time division multiple access communication system of claim 4 wherein each minor time frame is of a duration sufficient to support full duplex voice communication between said base station and a single user station.

7. The time division multiple access communication system of claim 4 wherein a user station operating in said first user station mode transmits video data or facsimile data at a higher data rate than necessary to transmit voice data.

8. The time division multiple access communication system of claim 4 wherein a user station operating in said second user station mode and said base station are capable of transmitting up to eight kilobits of information per second each direction in full duplex communication.

9. A time division multiple access communication system comprising:

a base station, a plurality of user stations communicating with said base station according to a time division multiple access communication protocol, a repetitive major time frame generated according to said time division multiple access communication protocol, a plurality of minor time frames in said major time frame, each of said minor time frames being freely allocable and of uniform duration a user-to-base transmission interval in each of said minor time frames, during which the user station to which the minor time frame is assigned transmits user-to-base messages to the base station, a base-to-user transmission interval in each of said minor time frames, during which the base station transmits base-to-user messages to the user station to which the minor time frame is assigned, and means for assigning minor time frames among a plurality of user stations, whereby a maximum data rate for communication between each user station and a base station is determined by a number of minor time frames assigned to the user station, said minor time frames being assigned according to user demand without regard to location within said major time frame.

10. The time division multiple access communication system of claim 9 wherein communications between said base station and said user stations are encoded using a direct sequence spread spectrum technique.

11. The time division multiple access communication system of claim 9 wherein said means for assigning minor time frames among said plurality of user stations comprises a bandwidth request message from a user station to said base station.

12. A method comprising the steps of:

generating a repetitive major time frame at a base station;

generating a series of minor time frames within each major time frame, each of said minor time frames being freely allocable and of uniform duration, and each minor time frame comprising a base-to-user transmission interval and a user-to-base transmission interval;

assigning, on demand, a first plurality of minor time frames to a first plurality of user stations, one minor time frame for each of said first plurality of user stations; and assigning, on demand, a second plurality of minor time frames to a single user station not within the group of said first plurality of user stations, said second plurality of minor time frames being assigned without regard to the relative locations of said minor time frames within a major time frame.

13. The method of claim 12 wherein said first plurality of minor time frames and said second plurality of minor time frames are assigned in response to a user-initiated request occurring during each of the available minor time frames for which assignment is sought by the user station.

14. The method of claim 12 further comprising the step of assigning, on demand, one of said minor time frames to a sub-rate user station for communication in every other major time frame or a less frequent basis, said one minor time frame not in the group of said first plurality of minor time frames or said second plurality of minor time frames.

15. The method of claim 12 further comprising the step of transmitting direct sequence spread spectrum messages between said base station and said user stations during the assigned minor time frames.

16. The method of claim 12, further comprising the step of designating each assigned minor time frame as being either symmetric or asymmetric, such that the user-to-base transmission interval of an assigned minor time frame designated as symmetric is equal in time allocation to its base-to-user transmission interval, and the user-to-base transmission interval of an assigned minor time frame designated as asymmetric is unequal in time allocation to its base-to-user transmission interval.

17. A method of wireless communication, comprising:

establishing a repeating major time frame;

establishing, in each major time frame, a plurality of minor time frames of uniform duration, each minor time frame being freely allocable and each comprising a user-to-base transmission interval and a base-to-user transmission interval;

assigning, on demand, and without regard to relative position within the major time frame, a minor time frame to each of a plurality of user stations requesting communication with a cellular base station, such that each user station transmits messages to the cellular base station in the user-to-base transmission interval of the assigned minor time frame and receives messages from the cellular base station in the base-to-user transmission interval of the assigned minor time frame;

assigning, on demand, and without regard to relative position within the major time frame, additional minor time frames to a user station so requesting, such that a user station with multiple assigned minor time frames transmits messages to the cellular base station in the user-to-base transmission interval of each assigned minor time frame and receives messages from the cellular base station in the base-to-user transmission interval of each assigned minor time frame; and designating each assigned minor time frame as being either symmetric or asymmetric, such that the user-to-base transmission interval of an assigned minor time frame designated as symmetric is equal in time allocation to its base-to-user transmission interval, and the user-to-base transmission interval of an assigned minor time frame designated as asymmetric is unequal in time allocation to its base-to-user transmission interval.

18. The method of claim 17, further comprising the step of transmitting both control signaling information and bearer traffic messages using the same minor time frame.

19. A wireless, cellular communication system, comprising:

a base station;

a plurality of user stations; and a time division duplex protocol according to which a repeating major time frame is divided into a plurality of freely allocable minor time frames of uniform duration, each minor time frame having a base-to-user transmission interval and a user-to- base transmission interval for supporting time division duplex communication between said base station and one of said user stations;

wherein said minor time frames are assigned to said user stations on demand and without regard to their relative positions within the major time frame;

wherein a user station transmits user-to-base messages during the user-to-base transmission interval of each minor time frame assigned to it, and receives base-to-user messages during the base-to-user transmission interval of each minor time frame assigned to it; and wherein each assigned minor time frame is designated as either symmetric or asymmetric, such that the user-to-base transmission interval of a minor time frame designated as symmetric is equal in time allocation to its base-to-user transmission interval, and the user-to-base transmission interval of a minor time frame designated as asymmetric is unequal in time allocation to its base-to-user transmission interval.

20. The wireless communication system of claim 19, wherein any minor time frame can be used for transmitting both control signaling information and bearer traffic messages.

* * * * *